Oct. 20, 1931.  C. B. O'CONNOR  1,827,953
AIRPLANE
Filed Dec. 3, 1928
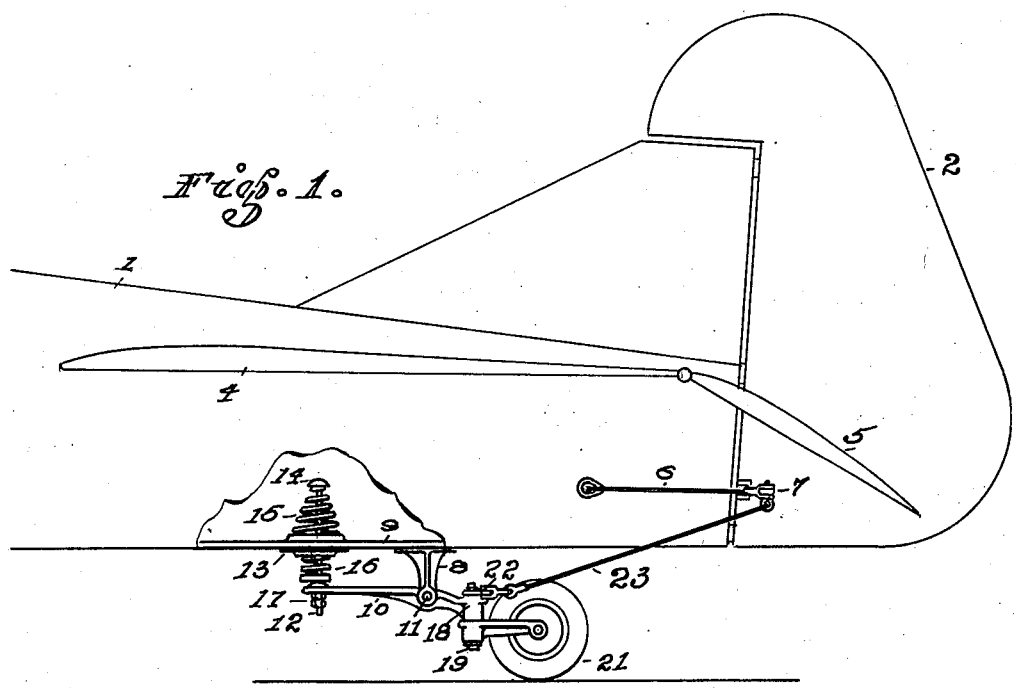
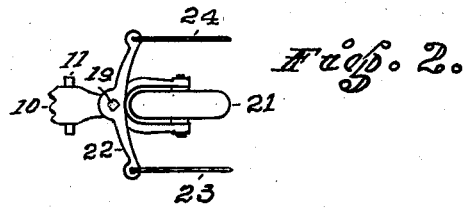
INVENTOR.
Clara B. O'Connor.
BY
Baldwin Vale ATTORNEY.

Patented Oct. 20, 1931

1,827,953

UNITED STATES PATENT OFFICE

CLARA B. O'CONNOR, OF SAN FRANCISCO, CALIFORNIA

AIRPLANE

Application filed December 3, 1928. Serial No. 323,219.

This invention relates to improvements in airplanes and more particularly to tail skids for tractor planes.

Among the objects of the invention are to provide a traction wheel tailskid that will caster; that may be controlled to act as a tiller wheel in maneuvering the airplane while on the ground; and that will resiliently ease the descent of the airplane tail in landing and in taking off.

The present invention is designed to supplant the conventional sprag-like tailskid, without roller or other means for supporting the weight of the tails of airplanes of the heavier type. In these very heavy planes the tractive friction exerted by the tailskid makes them difficult to maneuver since they do not readily obey the rudder when on the ground.

One of the advantages of this invention is that when installed, as shown, the heaviest planes can be "taxied" and maneuvered upon the ground under their own power, at the will of their own pilot, without outside aid.

Other objects and advantages will appear as this description progresses.

In this specification and the annexed drawings the invention is disclosed in the form considered the best. But it is to be understood that it is not limited to such form because it may be embodied in other forms, and in and by the claims following the description it is desired to cover the invention in whatsoever form it may be embodied.

In the accompanying one sheet of drawings:

Fig. 1 is a fragmentary detail in side elevation of the tail portion of a conventional airplane equipped with a tractor tail support in accordance with this invention.

Fig. 2 is a fragmentary detail plan view of the traction wheel and tiller control of the same.

In detail the construction illustrated in the drawings, referring to Fig. 1, consists of the tail end of the fuselage 1, having the conventional rudder 2, vertically pivoted thereto; the horizontal rudder 3, the stabilizers 4—5 and the usual rudder control cables 6, pivotally attached to the tiller bar 7 of the rudder, etc.

The bifurcated bracket 8 is fixed to any suitable part of the fuselage forward of the rudder, such as the flooring 9.

The cantilever 10 is horizontally pivoted on the transverse pin 11 in the bracket 8. The front end of this lever freely engages the vertical bolt 12, extending therethrough and upward through the floor plate 13, fixed in the floor 9, and terminates in the head 14.

The landing spring 15, expands between the head 14 and the floor plate 13. The rebound spring 16 expands between the opposite side of the floor plate and the end of the cantilever 10. These springs, the floor plate and the end of the lever 10 are held in assembly and the tension of the springs regulated by the adjusting and lock nuts 17 on the end of the bolt beneath the end of the lever 10.

The rear end of the lever 10 has the vertical socket 18 formed thereon to receive the vertical pivot 19 formed on the horizontal yoke 20.

The traction wheel 21, properly equipped with a resilient tire is journaled on a pin extending transversely across the ends of the yoke, in which it is fixed.

The upper end of the pivot 19 is provided with the tiller 22 fixed thereon. The opposite ends of this tiller 22 are linked by the flexible cables 23—24 with the opposite ends of the tiller bar 7 of the rudder 2, to cause the traction wheel 21 to move in unison with the rudder 2, see Fig. 2.

This invention operates substantially as follows: In traveling along the ground the tail of the airplane rides upon the tractor wheel 21. As the plane turns right or left the wheel casters on its vertical pivot 19, either in answer to the movement of the rudder 2, through the cables 23—24 or by natural castering as the fuselage changes direction.

In the "take off" as the plane races forward the traction wheel 21 rises and falls as inequalities in the ground surface are met. The lever 10 pivots on the bracket pin 11. The rise of the wheel 21, depresses the front end of the lever, pulling down on the bolt 12, which compresses the spring 15, reducing the shock of traction, maintaining the tail of the plane on a comparatively "even keel". The rebound, when the wheel drops into a depression or the spring 15 reacts, is absorbed by the compression of the rebound spring 16.

The front end of the lever 10 is held in normal equilibrium between the opposed tension of the springs 15 and 16.

At low speed on the ground the steered caster wheel 21 is more effective as a rudder in suddenly changing the direction of the plane. As the plane begins to lift as the speed increases the rudder 2 takes full effect as in practice.

In landing, the plane lands upon the conventional traction gear and the rear wheel comes into action to soften the impact through the spring assembly 15—16.

Having thus described this invention what I claim and desire to secure by Letters Patent is:

1. A traction gear comprising a cantilever fulcrumed on a vehicle, a traction wheel mounted upon one end of said lever, a spring interposed between said vehicle and the other end of said lever and a bolt passing through said spring and lever.

2. A traction gear comprising a cantilever fulcrumed on a vehicle, a caster traction wheel mounted upon one end of said lever, a plate fixed on said vehicle, springs fixed on opposite sides of said plate, a bolt passing through said springs and plate and engaging said lever.

3. In an airplane a traction gear comprising a cantilever fulcrumed on said airplane, a caster traction wheel mounted upon one end of said lever, resilient means interposed between said lever and said airplane body, and connecting means between said wheel and the rudder of said airplane and adapted to cause them to act in unison.

4. A traction gear comprising a cantilever fulcrumed on a vehicle, a caster traction wheel mounted upon one end of said lever, shock and rebound springs interposed between said vehicle and the other end of said lever to cushion the movements of said lever in landing and rebounding.

In testimony whereof I have hereunto affixed my signature.

CLARA B. O'CONNOR